Figure 1:
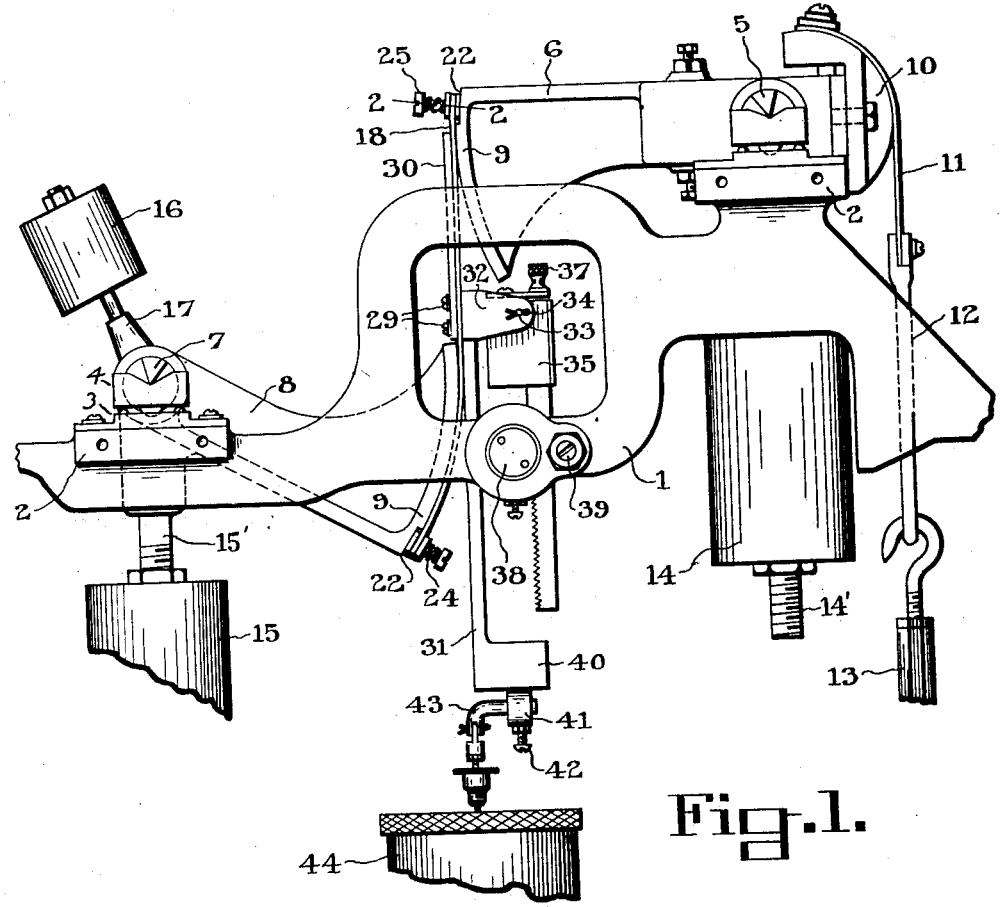

March 4, 1930. H. A. HADLEY 1,749,747
AUTOMATIC SCALE
Filed April 30, 1927

INVENTOR
Harlan A. Hadley
BY
Henry Thurman
ATTORNEY

Patented Mar. 4, 1930

1,749,747

UNITED STATES PATENT OFFICE

HARLAN A. HADLEY, OF ST. JOHNSBURY, VERMONT, ASSIGNOR TO E. AND T. FAIRBANKS AND COMPANY, OF ST. JOHNSBURY, VERMONT, A CORPORATION OF VERMONT

AUTOMATIC SCALE

Application filed April 30, 1927. Serial No. 187,881.

This invention relates to scales and more particularly to automatic scales of the pendulum type, wherein the weight is indicated by a pivoted pointer moving over a graduated chart.

In automatic scales of the type referred to, the pointer is commonly actuated by means of a pinion suitably connected thereto which meshes with a rack bar to which motion is imparted through the medium of a load actuated mechanism. From the standpoint of accurate weighing, it is of the utmost importance to keep the amount of friction between the pinion and rack bar to a minimum. In order to bring this condition about, namely, the keeping of the friction between the pinion and the rack bar to a minimum, it is necessary to maintain the reciprocation of the rack bar in a definite path relative to the pinion, or in other words, a straight line reciprocation. It will be obvious that if an angular motion be given the rack bar it would result in an additional source of error and would necessitate the making of compensation therefor in the scale. It is accordingly an important object of my invention to provide a scale mechanism which will impart to the rack bar a straight line reciprocation.

Another object of my invention is to provide, in a scale organization designed to utilize the double pendulum compensating mechanism, an improved connection between the pendulum arms which is so mounted on said arms as to be self-aligning and free from the danger of buckling when the scale mechanism is subjected to a strain caused by an impact thereon of unusual force.

Other objects and advantages will be apparent from the following description, in which reference is had to the accompanying drawings and in which similar reference characters designate similar elements throughout the several views.

Figure 2:
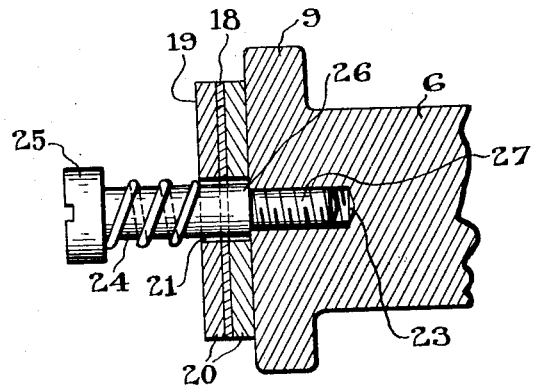

In the drawings:

Figure 1 is a side elevation of the head mechanism in a pendulum type scale with the pendulum frame and auxiliary pendulum weight partially cut away; and Figure 2 is an enlarged cross-sectional detail view of the tape clip taken on line 2—2 in Figure 1.

Referring to the drawings the pendulum frame 1 has formed integral therewith the bosses 2, 2 the surfaces of which are machined to form a rest for a self-aligning bearing structure comprising a longitudinally adjustable seat 3 and a bearing 4 swivelly mounted in said seat, as is disclosed in my co-pending application, Serial Number 184,310, filed April 16, 1927.

The bearings support the knife-edge pivot 5 of the pendulum arm 6 and the knife-edge pivot 7 of the auxiliary pendulum arm 8. The pendulum arm 6 and the auxiliary arm 8 have at one extremity a segment 9 which in form is a sector of a circle the radius of which is the distance from the peripheral surface of a segment to a point on the knife edge of a pendulum pivot. This is commonly referred to as the radius of the pendulum arm. It is to be understood that the horizontal distance between the knife-edges of the pendulum pivots is fixed and in the preferred embodiment of my invention is equal to twice the length of the radius of the pendulum arm.

The pendulum arm 6 also carries cam 10 which is adjustably mounted thereon and is adapted to be movable relative to said arm for the purpose of correcting inaccuracies, as is well understood in the art. The pendulum arm 6 is suitably connected as by means of a flexible tape, or ribbon 11, a connecting clevis 12 and a rod 13 to the scale levers (not shown). The pendulum arm 6 is counterbalanced by pendulum weight 14 adjustably mounted on a screw-threaded stem 14' and auxiliary pendulum arm is counterbalanced by a weight 15 adjustably mounted on a screw-threaded stem 15'. The auxiliary pendulum arm 8 is further counterbalanced by a weight 16 adjustably mounted on an offset stem 17.

The pendulum arm segments are connected by means of a tape, or ribbon, 18 on the extremities of which are suitable attached clips generally indicated by the reference numeral 19 (Figure 2). The clip comprises two metallic strips 20 between which the ribbon is suitably held, as by means of rivets (not shown). An aperture 21 extends through the clip and the ribbon held therebetween, the purpose of which will hereinafter be explained.

Each of the pendulum arm segments has a countersunk portion 22 formed at one end of the peripheral surface and from these portions extend longitudinally of the pendulum arms the screw-holes 23. The clips 19 holding the tape 18 are attached to the segments by studs 24. The studs have a head 25, shoulders 26, which are adapted to rest against the face of the countersunk portions 22 of the segments, and a threaded shank 27 which is adapted to be received in screw-hole 23.

Referring now to Figure 2, it will be observed that aperture 21 is slightly larger in diameter than stud 24, this being for the purpose of allowing the ribbon and its clips to have a loose pivotal connection with the studs. An expansion spring 28 having one end pressing against the head of the stud and the other against the clip resiliently holds the ribbon against the peripheral face of the segments.

Fastened to the ribbon 18, as by screws 29, are the upper rack guide 30 and a lower rack guide 31. The lower rack guide has integral with its upper end a clevis 32 having a bolt 33 extending therethrough; the bolt being retained in position by a cotter pin 34. Pivotally mounted on bolt 33 is a rack coupling 35 which is adapted to retain a rack bar 36. The rack bar is adjustable vertically in the coupling by means of screw 37.

The rack 36 meshes with a pinion (not shown) mounted for rotation in a ball race 38, the rack 36 being maintained in engagement with the pinion by an antifriction roller (not shown) mounted on a stub shaft 39 suitably attached to frame 1.

For the purpose of steadying the action of the scale parts, the lower rack bar guide has formed at its lower end a rectangular portion 40 on which is mounted an apertured lug 41 adjustably holding, as by means of a set srcrew 42, a clevis 43 suitably connected to a dampening means 44, as is well understood in the art.

It follows, therefore, from the construction outlined above, that when a load is placed upon the scale platform, the pull of the load is transmitted through the rod 13, connecting clevis 12, and ribbon 11 to the pendulum arm 6. The rotation of the pendulum arm 6 about its fulcrum will cause a wrapping of the ribbon 18 on the peripheral face of the segment of the pendulum arm. The rack bar guide is of course raised by the ribbon and being restrained by the opposed segments is forced to travel in a straight line. Due to the compensating effect of the auxiliary pendulum, the rack bar will have a straight line motion and maintain its accuracy event when the scale is placed out of level.

Having thus described my invention what I claim as new and desire to secure by Letters Patent of the United States is:

1. In a scale, the combination with a counterbalancing means, of a tape pivotally connected thereto, a rack bar mounted on said tape, and guiding means for said rack bar.

2. In a scale, the combination with a counterbalancing means, of a tape pivotally connected thereto, rack bar guides mounted on said tape and a rack bar on said guides.

3. In a scale, the combination with a counterbalancing means, of a tape pivotally attached thereto, a rack bar guide on said tape and a rack bar pivotally mounted on said guide.

4. In a scale, the combination with a counterbalancing means, of a tape pivotally attached thereto, a rack bar guide on said tape, a clevis on said guide and a rack bar pivotally mounted on said clevis.

5. In a scale, the combination with counterbalancing means, of a tape pivotally attached thereto, a rack bar guide on said tape, a clevis on said guide, a coupling pivotally mounted on said clevis, and a rack bar mounted in said coupling and adjustable relative thereto.

6. In a scale, the combination with a counterbalancing means, of a tape, a plurality of rack bar guides on said tape and a rack bar mounted on said guides.

7. In a scale, the combination with a counterbalancing means, of a tape pivotally attached thereto, a plurality of rack bar guides on said tape and a rack bar mounted on said guides.

8. In a scale, the combination with a counterbalancing means, of a flexible tape pivotally attached thereto, a plurality of guides on said tape and a rack bar pivotally mounted on said guides.

9. In a scale, the combination with a counterbalancing means, of a tape pivotally connected thereto, a rack bar and a rack bar guide mounted on said tape, and dampening means attached to said guide.

10. In a scale, in combination, a counterbalancing means comprising a pendulum arm and a second pendulum arm and a tape connecting said pendulum arms, said tape being pivotally attached to said pendulum arms.

11. In a scale, in combination, a counterbalancing means comprising a plurality of pendulum arms, a tape pivotally connected to said arms, a rack bar guide attached to said tape substantially centrally thereof and a rack bar attached to said guide.

12. In a scale, in combination, a counterbalancing means, comprising a plurality of pendulum arms having segments thereon, and a tape connecting said pendulum arms, and means for resiliently holding said tape against said segments.

13. In a scale, in combination, a counterbalancing means, comprising a plurality of pendulum arms having segments thereon, and a tape connecting said segments and being pivotally attached thereto.

14. In a scale, the combination with a counterbalancing means comprising a plurality of pendulum arms and a tape connecting said pendulum arms, of means to attach said tape to said pendulum arms comprising a stud and a spring on said stud adapted to resiliently hold the tape against said pendulum arms.

15. In a scale, in combination, a plurality of pendulum arms, a tape connecting said arms, said tape having clips at the extremities thereof, and means for resiliently holding said clips against said pendulum arms.

16. In a scale, in combination, a plurality of pendulum arms, a tape connecting said pendulum arms, and apertured clips on said tape adapted to be pivotally attached to said pendulum arms.

17. In a scale, in combination, a plurality of pendulum arms, studs thereon and a connection between said pendulum arms, comprising a tape adapted to be pivotally mounted on said studs.

18. In a scale, in combination, a plurality of pendulums having studs thereon, and means connecting said pendulum arms, comprising a tape having apertured clips at the extremities thereof, said clips being adapted for pivotal mounting on said studs.

19. In a scale, in combination, a plurality of pendulum arms, studs projecting therefrom, a tape mounted on said studs, and a rack bar mounted on said tape.

20. In a device of the character described, the combination with a counterbalancing means comprising a plurality of equal pendulum arms, of a flexible tape, pivotally connected to said arms.

21. In a device of the character described, the combination with a counterbalancing means comprising a plurality of equal pendulum arms, of a flexible tape, pivotally connected to said arms, and means for resiliently holding said tape against said arms.

22. In a device of the character described, the combination with a counterbalancing means comprising a pendulum arm and an auxiliary pendulum arm, said arms being of equal length, of a flexible tape pivotally connected to said arms and means for resiliently holding said tape against said arms including a stud on each of said arms and a spring on said studs.

23. In a device of the character described, in combination, a frame, bearings seated on said frame, pendulum arms pivoted in said bearings, a flexible tape pivotally attached to said arms, guides mounted on said tape, a rack bar on said guides and a pinion pivotally mounted in said frame and adapted to mesh with said rack bar.

24. In a device of the character described, in combination, a frame having a plurality of compensating bearings seated thereon, pendulum arms pivoted in said bearings, a flexible tape pivotally attached to said arms, a rack bar and means to guide said rack bar mounted on said tape and a pinion pivotally mounted in said frame and adapted to mesh with said rack bar.

HARLAN A. HADLEY.